(12) United States Patent
Varoquie et al.

(10) Patent No.: US 12,441,264 B2
(45) Date of Patent: Oct. 14, 2025

(54) DEVICE HAVING ELECTROMECHANICAL TRANSDUCERS FOR DETECTING APPROACH AND/OR CONTACT IN A MOTOR VEHICLE

(71) Applicant: Vitesco Technologies GmbH, Regensburg (DE)

(72) Inventors: Bertrand Varoquie, Toulouse (FR); Marina Labalette, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 36 days.

(21) Appl. No.: 18/685,059

(22) PCT Filed: Aug. 19, 2022

(86) PCT No.: PCT/EP2022/073231
§ 371 (c)(1),
(2) Date: Feb. 20, 2024

(87) PCT Pub. No.: WO2023/030928
PCT Pub. Date: Mar. 9, 2023

(65) Prior Publication Data
US 2024/0351543 A1   Oct. 24, 2024

(30) Foreign Application Priority Data

Sep. 2, 2021   (FR) ...................................... 2109162

(51) Int. Cl.
*B60R 21/013* (2006.01)
*B06B 1/02* (2006.01)
(Continued)

(52) U.S. Cl.
CPC .......... *B60R 21/013* (2013.01); *B06B 1/0215* (2013.01); *G01S 15/04* (2013.01);
(Continued)

(58) Field of Classification Search
CPC . B60R 21/013; B06B 1/0215; B06B 2201/55; B06B 2201/70; G01S 15/04;
(Continued)

(56) References Cited

U.S. PATENT DOCUMENTS

2010/0317977 A1   12/2010  Piaget et al.
2014/0133279 A1   5/2014   Khuri-yakub et al.
(Continued)

FOREIGN PATENT DOCUMENTS

CN   105790404 A   7/2016
EP   2610935 A1    7/2013
(Continued)

OTHER PUBLICATIONS

International Search Report (PCT/ISA/210) with translation and Written Opinion (PCT/ISA/237) mailed on Nov. 11, 2022 by the European Patent Office as the International Searching Authority for International Application No. PCT/EP2022/073231. (18 pages).
(Continued)

*Primary Examiner* — Lindsay M Low
*Assistant Examiner* — Charles J Brauch
(74) *Attorney, Agent, or Firm* — Buchanan Ingersoll & Rooney PC (57) ABSTRACT

A device for detecting contact with and/or an approach toward a motor vehicle. The device includes a vibration generator, including a first electromechanical transducer configured to be mounted on an external element of the motor vehicle, and an electrical signal generator that delivers, to the first electromechanical transducer, an electrical signal oscillating at an excitation frequency; a rechargeable energy storage device, for supplying power to the electrical signal generator; and a vibration sensor, consisting of a second electromechanical transducer configured to be mounted on the external element of the motor vehicle. An
(Continued)

output of the vibration sensor is connected to the rechargeable energy storage device, such that at least part of the electrical response signal recharges the rechargeable energy storage device.

20 Claims, 6 Drawing Sheets

(51) Int. Cl.
    *G01S 15/04*     (2006.01)
    *G01S 15/931*     (2020.01)
    *G10K 9/122*     (2006.01)

(52) U.S. Cl.
    CPC .............. *G01S 15/931* (2013.01); *G10K 9/122* (2013.01); *B06B 2201/55* (2013.01)

(58) Field of Classification Search
    CPC ....... G01S 15/931; G01S 7/521; G10K 9/122; G10K 9/18; E05Y 2900/531; H02N 2/18; E05F 15/43; E05F 2015/433
    See application file for complete search history.

(56) References Cited

U.S. PATENT DOCUMENTS

| | | |
|---|---|---|
| 2017/0368574 A1 | 12/2017 | Sammoura et al. |
| 2019/0189903 A1 | 6/2019 | Benedict et al. |
| 2020/0374013 A1 | 11/2020 | Jang et al. |
| 2021/0028725 A1 | 1/2021 | Griswold et al. |

FOREIGN PATENT DOCUMENTS

| | | | | |
|---|---|---|---|---|
| WO | WO-03012475 A1 * | 2/2003 | ........... | G01S 15/931 |
| WO | 2020055308 A1 | 3/2020 | | |

OTHER PUBLICATIONS

Mazzilli, Francesco, et al., "Ultrasound for Wireless Energy Transfer and Communication for Implanted Medical Devices", ESSCIRC 2010 Workshop, Ecole Polytechnique Fédérale de Lausanne (EPFL), RFIC Group, Lausanne, Switzerland, Sep. 17, 2010, pp. 1-28. (28 pages).

* cited by examiner

DEVICE HAVING ELECTROMECHANICAL TRANSDUCERS FOR DETECTING APPROACH AND/OR CONTACT IN A MOTOR VEHICLE

CROSS REFERENCE TO RELATED APPLICATIONS

This application is the U.S. National Phase Application of PCT International Application No. PCT/EP2022/073231, filed Aug. 19, 2022, which claims priority to French Application No. 2109162, filed Sep. 2, 2021, the contents of such applications being incorporated by reference herein.

FIELD OF THE INVENTION

The invention relates to the field of motor vehicles, and more particularly to that of detecting presence and/or contact in a motor vehicle, in order to detect an approach and/or direct physical contact between a motor vehicle and a target, such as an obstacle or an individual.

BACKGROUND OF THE INVENTION

The prior art discloses motor-vehicle contact or approach detection systems based on the use of a camera. Analyzing the acquired images makes it possible to determine information about the environment around the vehicle, in order to detect an approach or an intrusion. As a variant, it is possible to use the back-reflection of a laser or ultrasound signal to identify an element approaching the vehicle. However, these solutions exhibit various limitations, in particular their cost, their complexity of installation on the vehicle, and above all their high energy consumption.

SUMMARY OF THE INVENTION

An aspect of the invention is a solution that makes it possible ultimately to detect contact with and/or an approach toward a motor vehicle, and offering very low energy consumption.

This aspect is achieved with a device for a system for detecting contact with and/or an approach toward a motor vehicle, the device being configured to be mounted on said vehicle and comprising:
  a) a vibration generator, which comprises:
    a first electromechanical transducer, configured to generate a mechanical movement in response to an electrical excitation signal, and configured to be mounted on an external element of said motor vehicle; and
    an electrical signal generator, configured to deliver the electrical excitation signal to the first electromechanical transducer, the electrical excitation signal oscillating at an excitation frequency;
  b) a rechargeable energy storage device, configured to supply electrical energy to the electrical signal generator; and
  c) a vibration sensor, consisting of a second electromechanical transducer that is configured to generate an electrical response signal in response to a mechanical displacement and to be mounted on said external element of the motor vehicle;
  wherein an output of the vibration sensor is electrically connected to the rechargeable energy storage device such that, during use, at least part of the electrical response signal recharges the rechargeable energy storage device.

The external element of the motor vehicle preferably denotes a mechanical component formed in one piece and forming, during use, at least part of the external surface of the motor vehicle. It may for example be a bodywork element. As an alternative, it may be a pane of glass. Preferably, said external element extends along a surface defined by a maximum width and a maximum length, with a ratio of between 1 and 5 between length and width, where length and width denote the dimensions along two orthogonal axes of one and the same plane, with length greater than or equal to width.

During use, the vibration generator generates vibrations that it transmits to the external element of the motor vehicle.

The vibrations of the external element of the motor vehicle are related not only to the mechanical vibrations generated by the first electromechanical transducer, but also to the impact of the environment around the external element of the motor vehicle.

For example, direct physical contact between the external element of the motor vehicle and a human operator results in high attenuation of the vibration of the external element of the motor vehicle.

According to another example, the vibration of the external element of the motor vehicle generates the emission of an acoustic wave into the environment surrounding the vehicle, which reflects off any obstacles around the vehicle. The reflected acoustic wave is phase-shifted relative to the emitted acoustic wave, with a phase shift that varies with the distance between the obstacle and the vehicle. The reflected acoustic wave also has a frequency shift, related to the speed of the obstacle relative to the speed of the vehicle (Doppler effect). This phase-shifted and frequency-shifted acoustic wave propagates to the external element of the motor vehicle and influences the mechanical vibration thereof.

It will therefore be understood that measuring the mechanical vibrations of the external element of the motor vehicle makes it possible to detect direct physical contact with the motor vehicle and/or an approach in relation to said vehicle. In an aspect of the invention, this measurement is carried out by the vibration sensor.

One of the ideas on which an aspect of the invention is based is that of:
  using, as sensitive element of the vibration sensor, an electromechanical transducer that is configured to generate an electrical response signal in response to a mechanical displacement; and
  using the vibration sensor not only to measure mechanical vibrations, but also to recharge a rechargeable energy storage device that supplies power to the vibration generator.

At least some of the energy used to generate the vibrations is thus recuperated and used to generate new vibrations. The discharge of the rechargeable energy storage device is greatly slowed down, ultimately.

This thus gives a contact and/or approach detection device that exhibits very low energy consumption, ultimately. The device according to an aspect of the invention furthermore uses only inexpensive components. Finally, the device according to an aspect of the invention is easy to integrate into a motor vehicle. It may be integrated completely inside the vehicle, with the electromechanical transducers located on the external element of the motor vehicle and on the inner side of the vehicle. This thus prevents any premature deterioration or wear of the device according to an aspect of the invention.

Preferably, the vibrations generated by the first electromechanical transducer are small enough not to be perceived by a human operator, but enough to be perceived by the vibration sensor.

According to one particularly advantageous embodiment, the device according to the invention furthermore comprises a control unit, configured to monitor an energy level of the rechargeable energy storage device and to control the frequency of the electrical excitation signal delivered to the first electromechanical transducer such that:
a) when the energy level of the rechargeable energy storage device is lower than a predetermined threshold, the frequency of the electrical excitation signal is equal to a resonant frequency of the external element of the motor vehicle;
b) when the energy level of the rechargeable energy storage device is greater than said predetermined threshold, the frequency of the electrical excitation signal is other than said resonant frequency of the external element of the motor vehicle.

This thus involves monitoring a level of charge of the rechargeable energy storage device in real time and comparing this level of charge with a predetermined threshold in real time.

Throughout the text, a resonant frequency of the external element of the motor vehicle denotes the frequency of an eigenmode of vibration thereof, in particular the fundamental mode, or a harmonic mode.

The frequency of the electrical excitation signal, delivered at input of the first electromechanical transducer, is equal to the frequency of the mechanical oscillation generated in response thereby. Thus, when the frequency of the electrical excitation signal is equal to a resonant frequency of the mechanical element, this results in a resonance, and therefore a large amplitude of the vibrations of the mechanical element (excluding the influence of the external environment).

When the level of charge is lower than said predetermined threshold, it will be considered that the rechargeable storage device should be recharged. In this case, the control unit controls the vibration of the vibration generator at an excitation frequency equal to a resonant frequency of the external element of the motor vehicle. The vibration of the external element of the motor vehicle then goes into resonance. The amplitude of the vibration of the external element of the motor vehicle increases, thereby making it possible to recuperate a large amount of energy for recharging the rechargeable energy storage device.

This operating mode is implemented only on an ad-hoc basis, when the level of charge of the rechargeable energy storage device requires this. This thus avoids having permanently high amplitudes of mechanical vibrations that are liable to generate disturbances.

Advantageously, the excitation frequency that is used is the frequency of the fundamental mode of vibration of the external element of the motor vehicle. As a variant, the excitation frequency that is used is equal to the frequency of a first-order or even second-order harmonic mode of vibration of the external element of the motor vehicle. Preferably, a mode of vibration of the external element of the motor vehicle is defined by:
a mode along a first axis of a plane of said external element, and
a mode of vibration along a second axis of said external element, orthogonal to said first axis.

The mode of vibration of the external element is said to be fundamental when the mode along said first axis and the mode along said second axis are both fundamental modes. In all other cases, the mode of vibration of the external element is said to be harmonic. The order of a harmonic mode of vibration of the external element corresponds to the highest order out of the order of the mode along said first axis and the order of the mode along said second axis.

When the level of charge is greater than the predetermined threshold, it will be considered that the rechargeable storage device is sufficiently charged. In this case, the control unit sets the excitation frequency to a value other than that used in the previous operating mode. The vibration of the external element of the motor vehicle then has a limited amplitude, thereby making it possible to avoid disturbances, in particular noise pollution, in the surrounding environment. The trade-off is that the amplitude of the electrical response signal is also smaller, meaning that the charging of the rechargeable energy storage device is slower. In particular, the amount of energy used to generate the vibrations is then greater than the amount of energy recuperated to recharge the rechargeable energy storage device.

Preferably, in this operating mode, the excitation frequency is then set to a value other than the frequency of the fundamental mode of vibration of the external element of the motor vehicle. In addition or as a variant, said excitation frequency is then set to a value other than the frequency of at least one first-order and/or second-order harmonic mode of vibration of the external element of the motor vehicle.

Preferably, the device according to an aspect of the invention furthermore comprises a control unit, configured to monitor an energy level of the rechargeable energy storage device and to control the frequency of the electrical excitation signal such that:
a) when the energy level of the rechargeable energy storage device is lower than a predetermined threshold, the frequency of the electrical excitation signal is equal to a resonant frequency of the external element of the motor vehicle;
b) when the energy level of the rechargeable energy storage device is greater than said predetermined threshold, the frequency of the electrical excitation signal is other than said resonant frequency of the external element of the motor vehicle.

Said resonant frequency of the external element of the motor vehicle is advantageously the frequency of the fundamental mode of vibration of the external element of the motor vehicle.

As a variant, said resonant frequency of the external element of the motor vehicle may be the frequency of a harmonic mode of vibration of the external element of the motor vehicle.

The first electromechanical transducer advantageously comprises at least one piezoelectric element.

The second electromechanical transducer advantageously comprises at least one piezoelectric element (distinct from a piezoelectric element forming the first electromechanical transducer, when said first electromechanical transducer comprises at least one piezoelectric element).

Preferably, the external element of the motor vehicle is a bodywork element for a motor vehicle door.

An aspect of the invention also covers an assembly comprising the device according to an aspect of the invention along with the external element of the motor vehicle.

An aspect of the invention also covers an assembly comprising the device according to an aspect of the invention along with the external element of the motor vehicle, wherein the first electromechanical transducer is located at an antinode of the mode of vibration associated with said resonant frequency of the external element of the motor vehicle.

Preferably, the second electromechanical transducer is located at at least one node of the mode of vibration associated with said resonant frequency of the external element of the motor vehicle.

An aspect of the invention also covers a system for detecting contact with and/or an approach toward a motor vehicle, which system comprises a device according to an aspect of the invention along with a computer configured to:
- receive at least part of the electrical response signal generated by the vibration sensor,
- analyze this signal, and
- determine information relating to direct physical contact with the vehicle and/or information relating to an approach in relation to the vehicle.

Preferably, said system furthermore comprises an auxiliary detection unit having an active mode in which it is configured to implement presence and/or contact detection, and a standby mode, and the computer is configured to deliver a wake-up signal to the auxiliary detection unit when it is determined that there is direct physical contact with and/or an approach toward the vehicle so as to switch the auxiliary detection unit from standby mode to active mode.

The auxiliary detection unit advantageously comprises at least one out of an ultrasonic sensor and an image sensor.

The system according to an aspect of the invention may furthermore comprise the external element of the motor vehicle.

DESCRIPTION OF THE FIGURES

Other features and advantages of the invention will become more apparent upon reading the following description. This description is purely illustrative and should be read with reference to the appended drawings, in which:

FIG. 4A and

FIG. 5A and

FIG. 6A,

FIG. 6B, and

FIG. 8A,

FIG. 8B, and

DETAILED DESCRIPTION OF AT LEAST ONE EMBODIMENT

Figure 1:
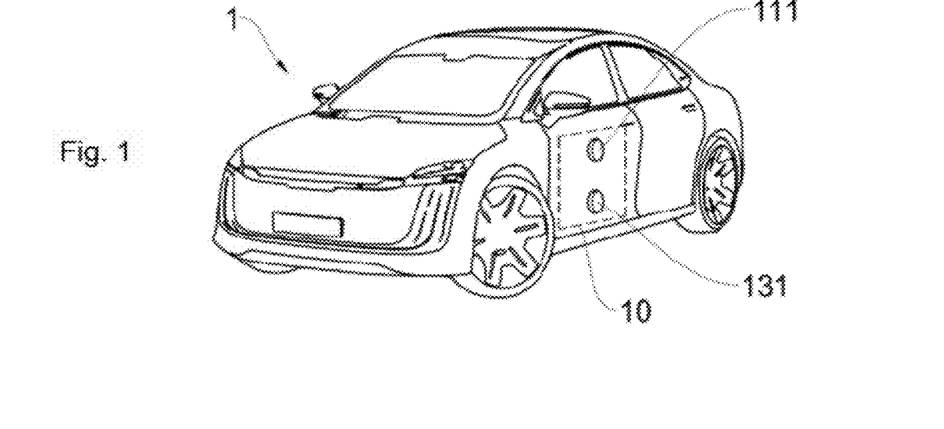
FIG. 1 schematically shows a motor vehicle equipped with the device according to an aspect of the invention.

FIG. 1 illustrates a motor vehicle 1 comprising a device according to an aspect of the invention. The device comprises in particular a first electromechanical transducer 111 and a second electromechanical transducer 131. The first and second electromechanical transducers 111, 131 are arranged on an external element 10 of the motor vehicle. In the examples outlined hereinafter, but without limitation, the external element 10 of the motor vehicle more particularly denotes a bodywork element of the motor vehicle. This may be a bodywork element belonging to a front door of the motor vehicle 1 on the driver's side. As a variant, it may be a bodywork element located on the hood, at the front of the vehicle, or at the rear of the vehicle, for example on the rear trunk, or on any other location on the motor vehicle.

Figure 2:
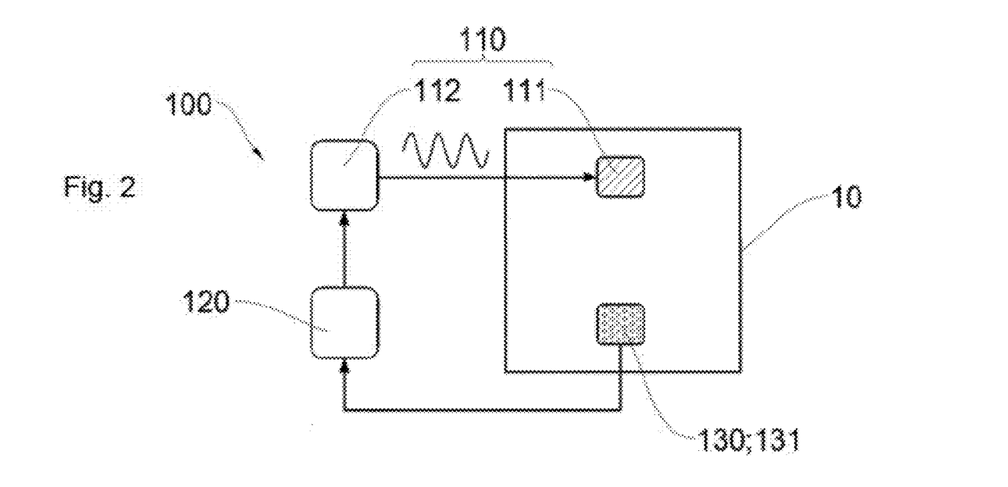
FIG. 2 schematically shows a device according to a first embodiment of the invention.

FIG. 2 schematically illustrates a device 100 according to a first embodiment of the invention. The device 100 is intended to form part of a contact and/or approach detection system for a motor vehicle, as illustrated hereinafter. The device 100 is intended to be housed on board said motor vehicle.

The device 100 comprises a vibration generator 110, a rechargeable energy storage device 120, and a vibration sensor 130.

The vibration generator 110 comprises the first electromechanical transducer 111, as shown schematically in FIG. 1, and an electrical signal generator 112.

The first electromechanical transducer 111 consists here of a piezoelectric actuator, configured to deform mechanically in real time in response to an electrical excitation signal received at input. The first electromechanical transducer 111 is configured to use the dynamic piezoelectric effect, with a frequency-based electrical excitation signal. At any time, the current amplitude of the mechanical deformation is a function of the current amplitude of the electrical excitation signal. During use, the first electromechanical transducer 111 is mounted fixedly with the bodywork element 10 of the motor vehicle 1, preferably directly on said bodywork element 10. However, the bodywork element 10 does not form part of the device 100 according to an aspect of the invention.

In some variants, the first electromagnetic transducer 111 may be based on a phenomenon other than the piezoelectric effect. In particular, it may utilize an induction phenomenon, current variations generating a displacement of a mobile element mounted fixedly with the bodywork element.

The electrical signal generator 112 is configured to generate the electrical excitation signal and to deliver it to the first electromechanical transducer. It is configured to deliver a frequency-based electrical signal, oscillating at an excitation frequency $f_E$. The frequency-based electrical signal is for example, but without limitation, a sinusoidal signal or a square-wave signal.

The rechargeable energy storage device 120 consists of a battery or a cell. It is configured to supply electric power to the electrical signal generator 112, so as to deliver thereto the electrical energy needed to generate the electrical excitation signal.

The vibration sensor 130 is formed here by the second electromechanical transducer 131, as shown schematically in FIG. 1. The second electromechanical transducer 131 consists here of a piezoelectric sensor, configured to generate an electrical response signal in real time, in response to the mechanical deformation thereof. The second electromechanical transducer 131 is then configured to use the dynamic piezoelectric effect. At any time, the current amplitude of the electrical response signal is a function of the current amplitude of the mechanical deformation of the electromechanical transducer 131. During use, the first electromechanical transducer 111 is mounted fixedly within the bodywork element 10 of the motor vehicle 1, preferably directly on said bodywork element 10. The current amplitude of the mechanical deformation of the electromechanical transducer 131 is then a function of the current amplitude of the deformation of the bodywork element 10.

An aspect of the invention is not limited to a second electromechanical transducer 131 consisting of a piezoelectric sensor. For example, the second electromechanical transducer 131 may utilize an induction phenomenon, using a membrane configured to be mounted fixedly with the bodywork element 10, and placed in a magnetic field using at least one magnet. The displacement of the membrane, produced by a displacement of the bodywork element, generates an induced current corresponding to the electrical response signal. According to another example, the second electromechanical transducer 131 may utilize a capacitive effect, using an electrically conductive membrane configured to be mounted fixedly with the bodywork element 10, and using an electrode forming a capacitor with said membrane. The displacement of the membrane, produced by a displacement of the bodywork element, generates a variation in the current at the terminals of the capacitor, said current forming the electrical response signal. Preferably, the second electromechanical transducer 131 is passive, that is to say it does not require any external input of energy to operate.

According to an aspect of the invention, an electrical output of the vibration sensor 130 is connected to the rechargeable energy storage device 120, such that at least part of the electrical response signal delivered at output of the vibration sensor 130 electrically recharges the rechargeable energy storage device 120.

Figure 3:
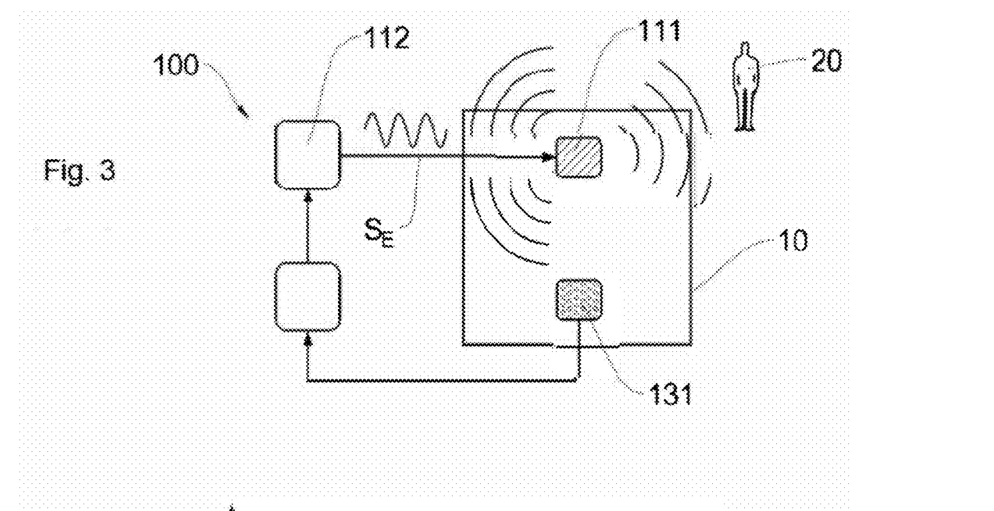
FIG. 3 schematically shows the device of FIG. 2, during use.

FIG. 3 schematically illustrates the device 100 during use. FIG. 3 will be described in conjunction with FIGS. 4A and 4B.

Figure 4A:
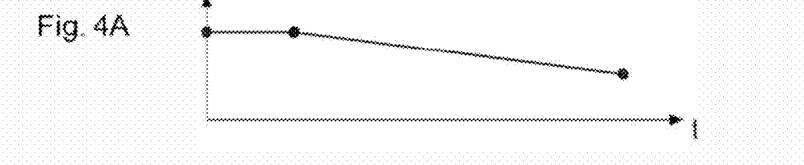
Figure 4B:
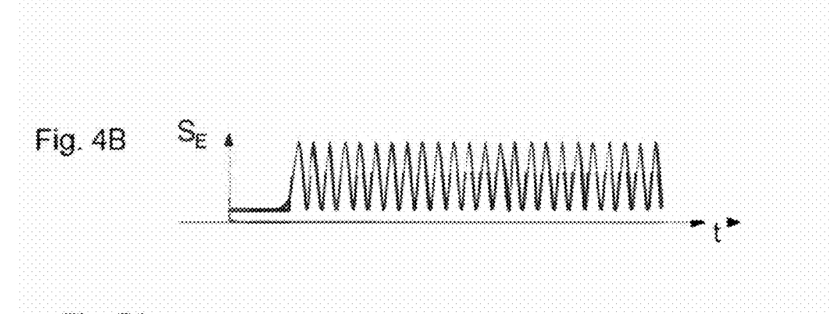
FIG. 4B schematically illustrate, along one and the same time axis, the evolution of a state of charge of the rechargeable energy storage device and the oscillations of the electrical excitation signal delivered to the first electromechanical transducer.

FIG. 4A shows a level of charge C of the rechargeable energy storage device 120, as a function of time t. FIG. 4B illustrates the electrical excitation signal $S_E$ delivered at input to the first electromechanical transducer 111, as a function of time t.

During use, the electrical signal generator 112 delivers, to the first electromechanical transducer 111, the electrical excitation signal $S_E$, as shown in FIG. 4B, of sinusoidal shape. In response, the first electromechanical transducer 111 generates mechanical vibrations at the frequency of the electrical excitation signal $S_E$. These mechanical vibrations cause vibration of the bodywork element 10 on which the first electromechanical transducer 111 is mounted, as illustrated schematically in FIG. 3.

The second electromechanical transducer 131 is mounted on the same bodywork element 10. It is subjected to the local vibrations of the bodywork element 10 at the location where it is mounted. These local vibrations are dependent not only on the loading caused by the first electromechanical transducer 111, but also on the influence of the external environment, in particular the influence of an individual 20 approaching or in contact with the bodywork element 10. The mechanisms of this influence of the individual on the mechanical vibrations of the bodywork element 10 will be described below.

In response to the local vibrations to which it is subjected, the second electromechanical transducer 131 generates an electrical response signal. This electrical response signal therefore includes information relating to the external environment, in particular relating to an individual approaching or in contact with the bodywork element 10. This electrical response signal may therefore be analyzed so as to extract this information therefrom.

According to an aspect of the invention, this electrical response signal is furthermore injected, in full or in part (preferably in full), at input of the rechargeable energy storage device 120. It thus makes it possible to partially recharge the rechargeable energy storage device 120. The discharge thereof is therefore slowed down, since some of the energy delivered to the first electromechanical transducer 111 in order to generate the electrical excitation signal is recuperated via the second electromechanical transducer 131. FIG. 4A illustrates this slow discharge of the rechargeable energy storage device 120.

Hereinafter, the influence of the environment on the electrical response signal is described in two particular cases.

Figure 5A:
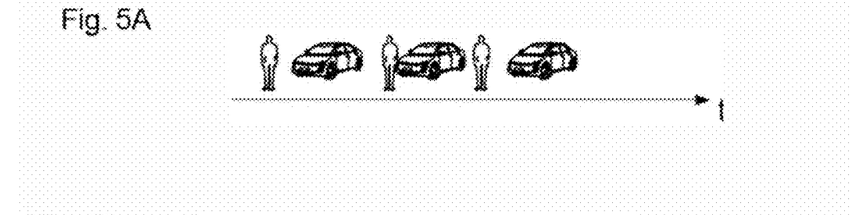
Figure 5B:
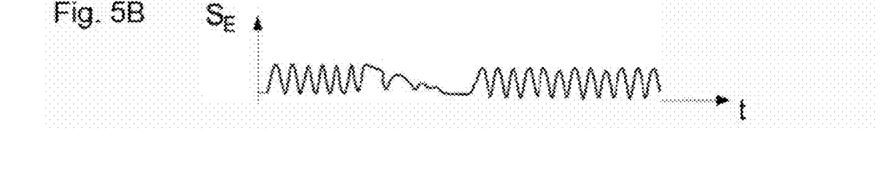
FIG. 5B schematically illustrate, along one and the same time axis, the movement of an individual coming into contact with a vehicle equipped with the device according to an aspect of the invention, and the electrical response signal delivered by the second electromechanical transducer.

FIGS. 5A and 5B relate to the case in which the environment comprises an individual coming into direct physical contact with the motor vehicle on the bodywork element receiving the first and second electromechanical transducers. FIG. 5A shows this individual, who approaches the motor vehicle, makes direct physical contact with the bodywork element and then stops this contact. FIG. 5B shows the corresponding electrical response signal $S_{R1}$, as a function of time. In the absence of direct physical contact between the individual and the bodywork element, the electrical response signal $S_{R1}$ is a sinusoidal signal. When the individual is in direct physical contact with the bodywork element, the amplitude of the electrical response signal $S_{R1}$ drops sharply, until reaching the value of zero here. When the direct physical contact is released, the electrical response signal $S_{R1}$ begins to oscillate again and the amplitude of the oscillations returns to its initial value. Analyzing the electrical response signal thus makes it possible to detect direct physical contact between an individual and the motor vehicle, for example in order to detect an attempt to intrude and/or break into the vehicle.

Figure 6A:
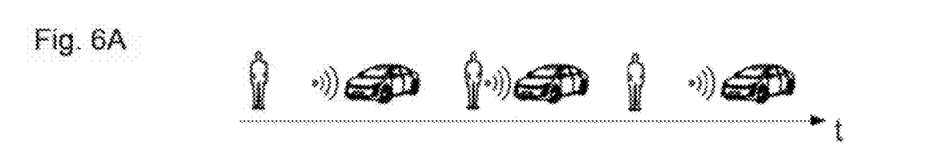
Figure 6B:
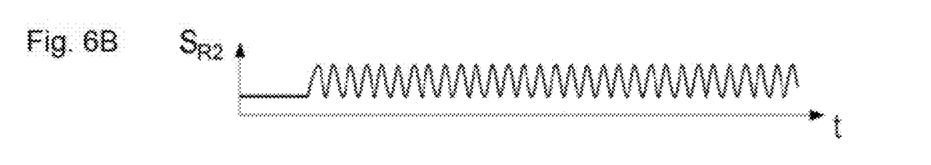
Figure 6C:
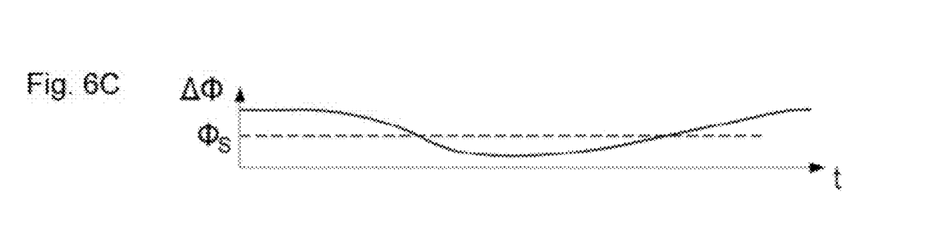
FIG. 6C schematically illustrate, along one and the same time axis, a movement of an individual approaching and then moving away from a vehicle equipped with the device according to an aspect of the invention, the electrical response signal delivered by the second electromechanical transducer, and a phase shift of said electrical response signal.

FIGS. 6A, 6B and 6C relate to the case in which the environment comprises an individual who approaches and then moves away from a motor vehicle equipped with a device according to an aspect of the invention. FIG. 6A shows this individual, who approaches the motor vehicle and then moves away.

FIG. 6B shows the corresponding electrical response signal $S_{R2}$, as a function of time. The electrical response signal $S_{R2}$ is a sinusoidal signal, with a substantially constant amplitude. The electrical response signal $S_{R2}$ reproduces the mechanical vibrations of the bodywork element, at the location of the second electromechanical transducer 131.

At any time, these vibrations are the result of:

the mechanical oscillation induced directly by the current mechanical vibrations of the first electromechanical transducer 111, and the mechanical oscillation induced by a reflected acoustic wave that results from the reflection, off the individual, of an initial acoustic wave produced by the mechanical vibrations of the bodywork element at a previous time.

Since the optical path traveled by the acoustic wave is generally not an integer multiple of the wavelength of the initial acoustic wave, the reflected acoustic wave is phase-shifted relative to the initial acoustic wave. The value of this phase shift varies as a function of the distance between the device according to an aspect of the invention and the individual off whom the acoustic wave is reflected. When the object off which the initial acoustic wave is reflected is a moving object relative to the device according to an aspect of the invention, the reflected acoustic wave furthermore exhibits a frequency shift relative to the initial acoustic wave (Doppler effect). This phase shift, and where applicable this frequency shift, is/are encountered on the mechanical oscillation induced by the reflected acoustic wave, and therefore on the electrical response signal $S_{R2}$.

A person skilled in the art will know how to process the electrical response signal $S_{R2}$ so as to extract therefrom information relating to this phase difference (and where applicable this frequency shift). The processing may use a wavelet transformation, and/or a search for similarity with an expected shape (determined during a preliminary calibration step), etc. For the analysis of the electrical response signal $S_{R2}$, it will advantageously be considered that the frequency and the phase of the initial acoustic wave are respectively equal to the frequency and the phase of the electrical excitation signal $S_E$.

FIG. 6C shows the phase shift $\Delta\varphi$ between the initial acoustic wave and the reflected acoustic wave, corresponding to a phase shift between the electrical response signal $S_{R2}$ and the electrical excitation signal $S_E$.

As the individual approaches the vehicle and the device according to an aspect of the invention, the phase shift $\Delta\varphi$ varies, by decreasing here. Next, as the individual moves away from the vehicle and the device according to an aspect of the invention, the phase shift $\Delta\varphi$ varies the other way, by increasing here. Monitoring the phase shift $\Delta\varphi$ makes it possible to detect the approach of an individual relative to the device and to the vehicle according to an aspect of the invention. Where applicable, it is possible to compare the value of the phase shift $\Delta\varphi$ with a threshold value $\varphi s$ in order to identify the presence of an object or an individual in the immediate proximity of the device and the vehicle according to the invention.

The example of an individual approaching the device and the vehicle according to an aspect of the invention has been adopted here. In addition or as a variant, an aspect of the invention makes it possible to detect the approach of an animal or a non-living obstacle that is possibly stationary in the terrestrial frame of reference but mobile relative to the moving vehicle. An aspect of the invention thus makes it possible to implement not presence detection, but rather obstacle detection, for example in an assisted driving context.

Advantageously, the frequency of the electrical excitation signal $S_E$, called excitation frequency $f_E$, is other than the frequency of the fundamental mode of vibration of the bodywork element 10. Even more advantageously, the excitation frequency $f_E$ is other than the respective frequencies of the first-order or even second-order modes of vibration of the bodywork element 10. This thus avoids a resonance phenomenon that amplifies the mechanical resonance of the bodywork element and is likely to produce discomfort in the environment (strong vibrations and/or an annoying acoustic signal).

As a variant, the frequency of the electrical excitation signal $S_E$ is equal to the frequency of a mode of vibration of the bodywork element (fundamental mode, or harmonic mode, in particular a first-order or even second-order harmonic mode). This variant makes it possible to amplify the mechanical resonance of the bodywork element, and therefore the amplitude of the electrical response signal generated by the vibration sensor 130. This variant makes it possible to maximize the recharging of the rechargeable energy storage device 112.

A description will now be given, with reference to FIG. 7, of a device 200 according to a second embodiment of the invention. The device 200 will be described only in terms of its differences in relation to the device of FIG. 2. Here, the device 200 furthermore comprises a control unit 240. The control unit 240 is configured to:

monitor an energy level, or level of charge, of the rechargeable energy storage device 200; and control the frequency of the electrical excitation signal $S_E$, sent to the first electromechanical transducer 211 by the electrical signal generator 212.

The device 200 is configured to:

when the energy level of the rechargeable energy storage device 222 is lower than or equal to a predetermined threshold, set the frequency of the electrical excitation signal $S_E$ to a first excitation frequency value, $f_{E1}$, equal to a resonant frequency of the bodywork element 10.

when the energy level (or level of charge) of the rechargeable energy storage device 220 is greater than said predetermined threshold, set the frequency of the electrical excitation signal $S_E$ to a second excitation frequency value, $f_{E2}$, other than said resonant frequency of the bodywork element 10.

In the first case, preference is given to the recharging efficiency of the rechargeable energy storage device. In the second case, preference is given to comfort in the surrounding environment. This embodiment thus offers an optimum compromise, making it possible to give preference to one or the other out of comfort or recharging efficiency of the rechargeable energy storage device, depending on a state of charge of said rechargeable energy storage device.

The first excitation frequency value, $f_{E1}$, is for example equal to the frequency of the fundamental mode of vibration of the bodywork element 10. As a variant, $f_{E1}$ may be equal to the frequency of a harmonic mode of vibration of the bodywork element 10, for example a first-order or even second-order mode.

The second excitation frequency value, $f_{E2}$, is other than $f_{E1}$. In one advantageous variant, it is other not only than the frequency of the fundamental mode of vibration of the bodywork element 10, but also than the frequencies of the first-order, or even second-order, or even higher-order harmonic modes.

Figure 7:
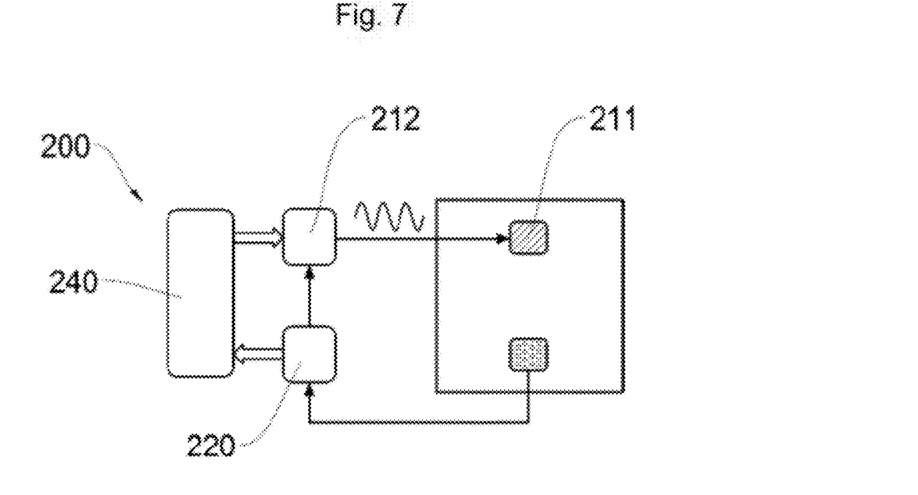
FIG. 7 schematically illustrates a device according to a second embodiment of the invention.
Figure 8A:
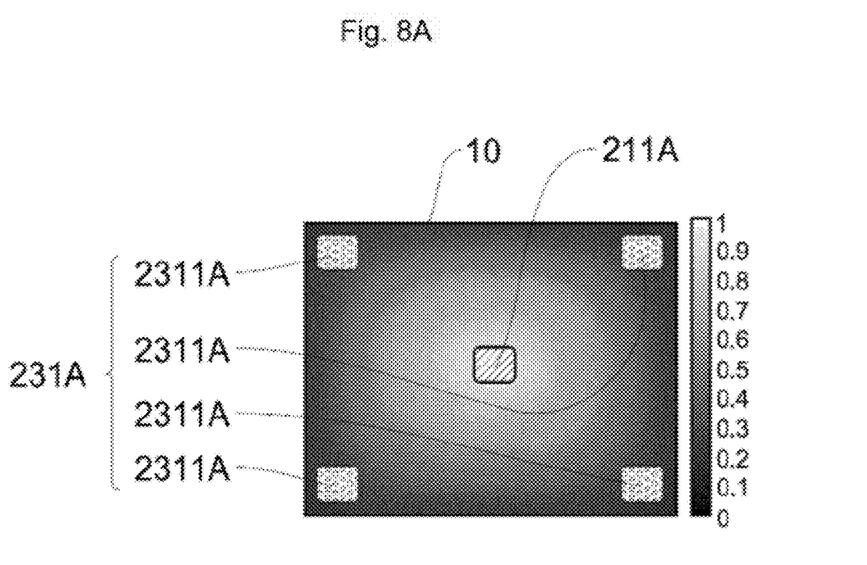
Figure 8B:
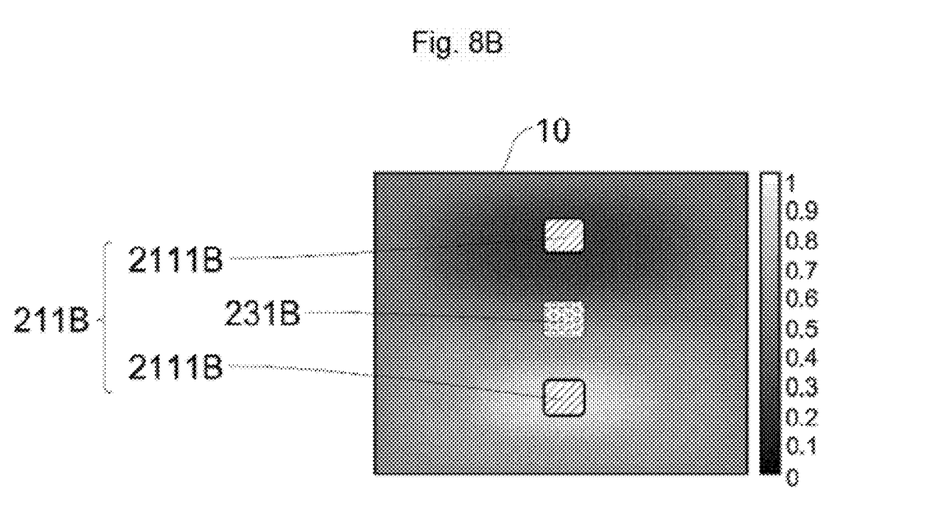
Figure 8C:
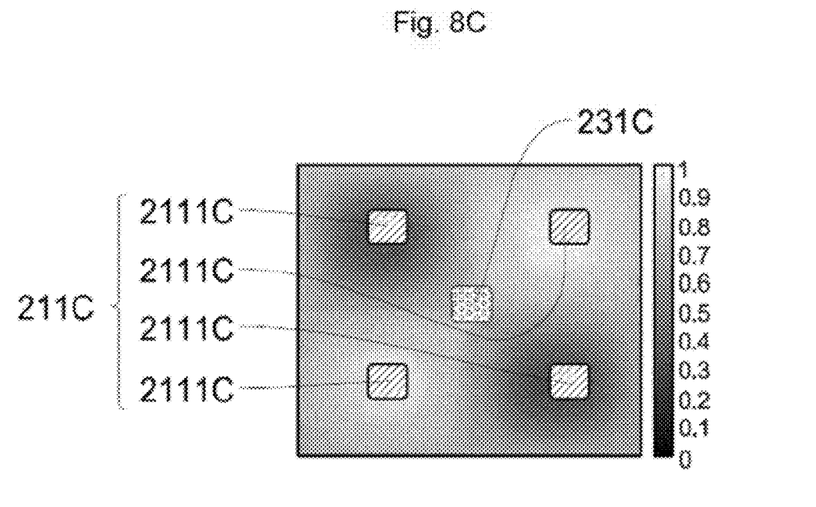
FIG. 8C schematically illustrate various possible positions of the first and second electromechanical transducers, on the external element of the motor vehicle associated with the device according to the invention.

FIGS. 8A to 8C illustrate various arrangements of the first and second electromechanical transducers on the bodywork element 10, in a device as shown in FIG. 7. The bodywork element 10 here is of square or rectangular shape. In each figure, a grayscale level represents a normalized vibration amplitude at the location under consideration on the bodywork element 10. The grayscale scale is shown on the right.

In FIG. 8A, the first excitation frequency value, $f_{E1}$, is equal to the frequency of the fundamental mode of vibration of the bodywork element. This frequency is for example 3 Hz. This fundamental mode is denoted [0; 0], where the digit 0 corresponds to the fundamental mode along a first axis of a plane of the bodywork element, and the digit 0 corresponds to the fundamental mode along a second axis of said plane of the bodywork element, orthogonal to said first axis.

The first electromechanical transducer 211A consists here of a single piezoelectric element, positioned in the center of the bodywork element 10, at an antinode of the vibration of the fundamental mode.

This positioning at a vibration antinode makes it possible to maximize the amplitude of the mechanical vibration induced by the first electromechanical transducer 211A. This makes it possible to maximize the (mechanical or acoustic) signal interacting with the external environment, and therefore to improve the approach and/or contact detection.

The second electromechanical transducer 231A consists here of four piezoelectric elements 2311A, positioned in the four corners of the bodywork element 10, at a vibration node of the bodywork element 10.

This positioning at a vibration node makes it possible to minimize the influence of the vibration induced directly by the first electromechanical transducer 211A on the vibration measured by the second electromechanical transducer 231A. This thus maximizes the relative influence of the environment, in particular the influence of a reflected acoustic wave. The signal-to-noise ratio is therefore improved.

The use of the fundamental mode also allows the antinode and the vibration nodes to be very far physically from one another, thereby reducing the required precision with regard to the positioning of the first and second electromechanical transducers.

In FIG. 8B, the first excitation frequency value, $f_{E1}$, is equal to the frequency of a harmonic mode of vibration of the bodywork element, denoted [0; 1], where the digit 0 corresponds to the fundamental mode along a first axis of a plane of the bodywork element, and the digit 1 corresponds to the first-order harmonic along a second axis of said plane of the bodywork element, orthogonal to said first axis. This frequency is 19 Hz here.

The second electromechanical transducer 231B consists here of a single piezoelectric element, positioned in the center of the bodywork element 10 and at a vibration node of said bodywork element 10.

The first electromechanical transducer 211B consists here of two piezoelectric elements 2111B, positioned on either side of the second electromechanical transducer 231B, along an axis parallel to two opposite edges of the bodywork element 10 and passing through the center of the bodywork element 10. These two piezoelectric elements 2111B extend to two respective antinodes of the vibration of the bodywork element 10.

In this case too, the first electromechanical transducer 211B is located at at least one vibration antinode of the bodywork element 10 and the second electromechanical transducer 231B is located at at least one vibration node of the bodywork element 10. The advantages of the arrangement of FIG. 8A are therefore encountered, accessible for another value of $f_{E1}$.

In FIG. 8C, the first excitation frequency value, $f_{E1}$, is equal to the frequency of a harmonic mode of vibration of the bodywork element, denoted [1; 1] (where the digit 1 corresponds to the first-order harmonic along a first axis of a plane of the bodywork element, and the digit 1 corresponds to the first-order harmonic along a second axis of said plane of the bodywork element, orthogonal to said first axis).

The first electromechanical transducer 211C consists here of four piezoelectric elements 2111C, positioned in the four corners of a square, along the two diagonals of the bodywork element 10, at four respective antinodes of the vibration of the bodywork element 10.

The second electromechanical transducer 231C consists here of a single piezoelectric element, positioned in the center of the bodywork element 10, at a vibration node of said bodywork element 10.

In this case too, the first electromechanical transducer 211C is located at at least one vibration antinode of the bodywork element 10 and the second electromechanical transducer 231C is located at at least one node of the bodywork element 10. The advantages of the arrangement of FIG. 8A are therefore encountered, accessible for another value of $f_{E1}$.

In some variants that are not shown, the second electromechanical transducer is located at or close to a vibration antinode of the bodywork element 10, in order to increase the amplitude of the mechanical vibration measured thereby, and thus the amplitude of the electrical response signal used to recharge the rechargeable energy storage device.

A person skilled in the art will know how to optimize the arrangement of the first and second electromechanical transducers, along with the number of piezoelectric elements that they comprise, depending in particular on the oscillation frequencies available for the electrical excitation signal, the modes of vibration of the bodywork element, and a need to give preference to the recharging efficiency of the rechargeable energy storage device (via a second electromechanical transducer close to a vibration antinode) or a good signal-to-noise ratio on the approach and/or contact detection (via a second electromechanical transducer close to a vibration node).

The arrangements described above may also be applied to a device according to the first embodiment, wherein the electrical excitation signal $S_E$ always has the frequency of a mode of vibration of the bodywork element.

An aspect of the invention thus covers an assembly comprising a device according to an aspect of the invention, in particular according to the first or second embodiment of the invention, along with the bodywork element receiving the first and second electromechanical transducers, and wherein:
   the first electromechanical transducer is located in a central region of the bodywork element; and
   the second electromechanical transducer is located in a plurality of peripheral regions of the bodywork element.

As a variant, an aspect of the invention covers an assembly comprising a device according to an aspect of the invention, in particular according to the first or second embodiment of the invention, along with the bodywork element receiving the first and second electromechanical transducers, and wherein:
   the second electromechanical transducer is located in a central region of the bodywork element, and
   the first electromechanical transducer is located in two regions located on either side of the second electromechanical transducer.

According to another variant, an aspect of the invention covers an assembly comprising a device according to an aspect of the invention, in particular according to the first or second embodiment of the invention, along with the bodywork element receiving the first and second electromechanical transducers, and wherein:

the second electromechanical transducer is located in a central region of the bodywork element, and the first electromechanical transducer is located in a plurality of regions located around the second electromechanical transducer.

Figure 9:
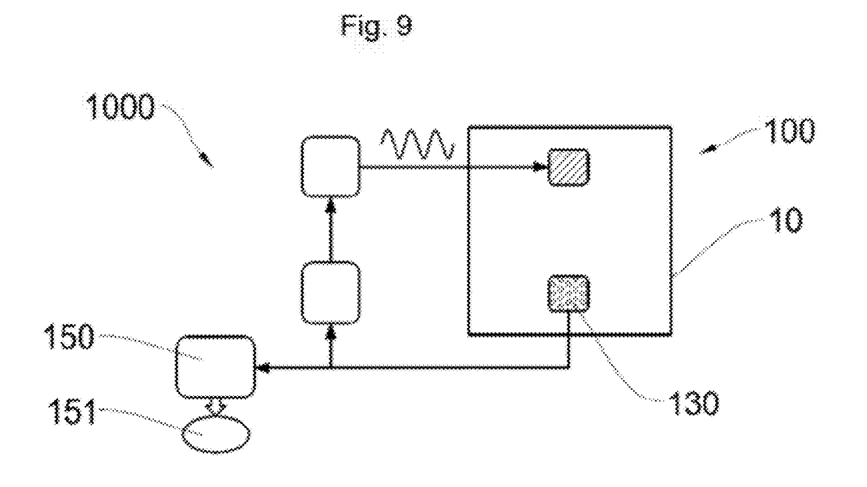
FIG. 9 schematically illustrates a first embodiment of a contact and/or approach detection system according to the invention.

A description will now be given of a contact and/or approach detection system 1000 of FIG. 9 that comprises:

a device according to an aspect of the invention, here a device 100 according to the first embodiment of the invention; and a computer 150, configured to receive at least part of the electrical response signal from the vibration sensor 130 at input, to analyze this signal, and to deliver information 151 relating to an approach and/or direct physical contact with the vehicle at output.

The computer 150 comprises at least one processor. The signal analysis implemented by the computer 150 is described with reference to FIGS. 5A and 5B, respectively 6A to 6C. In particular, the signal analysis may comprise signal damping detection, associated with direct physical contact between the bodywork element 10 and an individual. In addition or as a variant, the signal analysis comprises a phase shift measurement, associated with a displacement of an individual in the proximity of the bodywork element 10.

The information 151 may comprise a datum relating to the detection of direct physical contact with the bodywork element and/or a datum relating to the detection of an individual approaching the bodywork element. This datum may be transmitted to the vehicle's event log. In addition or as a variant, this datum may be used by auxiliary systems in the motor vehicle, for example to trigger an alarm that emits an acoustic signal so as to alert the surroundings in the event of intrusion.

In one variant that is not shown, the device according to an aspect of the invention is a device according to the second embodiment.

Figure 10:
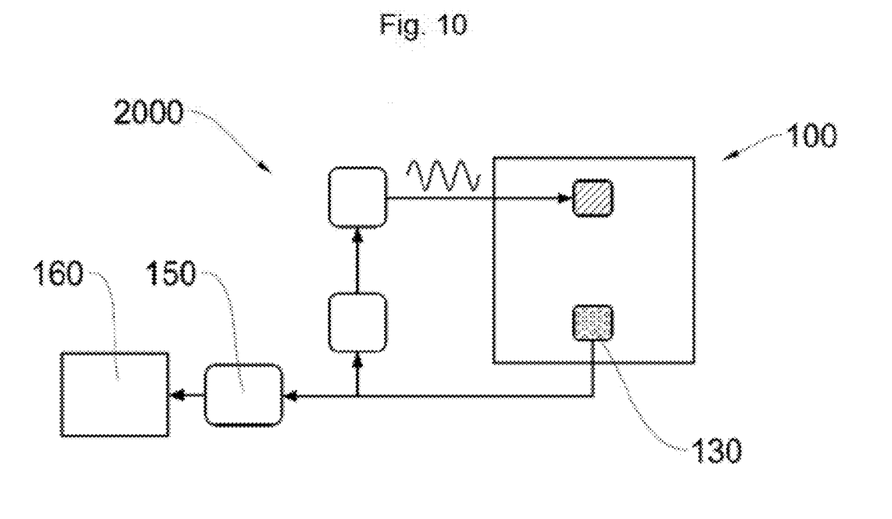
FIG. 10 schematically illustrates a second embodiment of a contact and/or approach detection system according to the invention.

Finally, FIG. 10 illustrates a second embodiment of a contact and/or approach detection system 2000 according to the invention. The system 2000 will be described only in terms of its differences in relation to the system of FIG. 9.

Here, the system 2000 furthermore comprises an auxiliary detection unit 160, configured to receive the information relating to an approach and/or direct physical contact with the vehicle from the computer 150.

The auxiliary detection unit 160 is able to implement contact and/or approach detection, based for example on image acquisition using a camera, or on laser detection, or on ultrasonic detection.

By default, the auxiliary detection unit 160 is in a standby mode in which it does not carry out detection and therefore consumes very little electrical energy.

The auxiliary detection unit 160 is configured to switch from standby mode to an active mode when it receives information relating to an approach and/or direct physical contact with the vehicle. The information relating to an approach and/or direct physical contact with the vehicle thus forms a wake-up signal for the auxiliary detection unit 160.

In the active mode, the auxiliary detection unit 160 carries out approach and/or contact detection that makes it possible to confirm or refute the detection implemented on the basis of the vibration measurements, using the device 100 according to an aspect of the invention. After it has confirmed or refuted the information delivered by the computer 150, the auxiliary detection unit 160 switches back to standby mode.

This embodiment makes it possible to consolidate the approach and/or contact detection using an auxiliary detection unit that is able to deliver more accurate information than the device according to an aspect of the invention. In addition, this consolidation of information does not result in much higher energy consumption since the auxiliary detection unit 160 remains in standby mode most of the time.

In one variant that is not shown, the device according to an aspect of the invention is a device according to the second embodiment.

Many variants of aspects of the invention may be implemented, in particular by combining the various examples described above. An aspect of the invention may be implemented for all kinds of values of the frequency of the electrical excitation signal, preferably values lower than 20 Hz in order to limit acoustic disturbance.

In another advantageous variant, the device according to an aspect of the invention may have a standby mode in which the first electromechanical transducer is not supplied with electric power, and an active mode in which, by contrast, it is supplied with electric power. The device according to an aspect of the invention may then be configured to switch to active mode only when the engine of the vehicle is switched off and/or when a vehicle parking mode is activated.

An aspect of the invention is applied to particular advantage in the prevention of vandalism. It makes it possible to predict and/or detect intrusion into the motor vehicle. Other applications are also possible, in particular obstacle detection in an autonomous driving context.

The invention claimed is:

1. A device for a system for detecting contact with and/or an approach toward a motor vehicle, the device being configured to be mounted on said vehicle, the device comprising:

a) a vibration generator, which comprises:

a first electromechanical transducer, configured to generate a mechanical movement in response to an electrical excitation signal, and configured to be mounted on an external element of said motor vehicle; and an electrical signal generator, configured to deliver the electrical excitation signal to the first electromechanical transducer, the electrical excitation signal oscillating at an excitation frequency;

b) a rechargeable energy storage device, configured to supply electrical energy to the electrical signal generator; and c) a vibration sensor, consisting of a second electromechanical transducer that is configured to generate an electrical response signal in response to a mechanical displacement and to be mounted on said external element of the motor vehicle;

wherein an output of the vibration sensor is electrically connected to the rechargeable energy storage device such that, during use, at least part of the electrical response signal recharges the rechargeable energy storage device.

2. The device as claimed in claim 1, further comprising a control unit, configured to monitor an energy level of the rechargeable energy storage device and to control the frequency of the electrical excitation signal such that:

a) when the energy level of the rechargeable energy storage device is lower than a predetermined threshold, the frequency of the electrical excitation signal is equal to a resonant frequency of the external element of the motor vehicle;

b) when the energy level of the rechargeable energy storage device is greater than said predetermined threshold, the frequency of the electrical excitation signal is other than said resonant frequency of the external element of the motor vehicle.

3. The device as claimed in claim 2, wherein said resonant frequency of the external element of the motor vehicle is the frequency of the fundamental mode of vibration of the external element of the motor vehicle.

4. The device as claimed in claim 2, wherein said resonant frequency of the external element of the motor vehicle is the frequency of a harmonic mode of vibration of the external element of the motor vehicle.

5. The device as claimed in claim 1, wherein the first electromechanical transducer comprises at least one piezoelectric element.

6. The device as claimed in claim 1, wherein the second electromechanical transducer comprises at least one piezoelectric element.

7. The device as claimed in claim 1, wherein the external element of the motor vehicle is a bodywork element for a motor vehicle door.

8. An assembly comprising the device as claimed in claim 1 along with the external element of the motor vehicle.

9. An assembly comprising the device as claimed in claim 2 along with the external element of the motor vehicle, wherein the first electromechanical transducer is located at an antinode of the mode of vibration associated with said resonant frequency of the external element of the motor vehicle.

10. The assembly as claimed in claim 9, wherein the second electromechanical transducer is located at least one node of the mode of vibration associated with said resonant frequency of the external element of the motor vehicle.

11. A system for detecting contact with and/or an approach toward a motor vehicle, which system comprises a device as claimed in claim 1 along with a computer configured to:
receive at least part of the electrical response signal generated by the vibration sensor,
analyze this signal, and
determine information relating to direct physical contact with the vehicle and/or information relating to an approach in relation to the vehicle.

12. The system as claimed in claim 11, further comprising an auxiliary detection unit having an active mode in which it is configured to implement presence and/or contact detection, and a standby mode, and in that the computer is configured to deliver a wake-up signal to the auxiliary detection unit when it is determined that there is direct physical contact with and/or an approach toward the vehicle so as to switch the auxiliary detection unit from standby mode to active mode.

13. The system as claimed in claim 12, wherein the auxiliary detection unit comprises at least one out of an ultrasonic sensor and an image sensor.

14. The system as claimed in claim 11, further comprising the external element of the motor vehicle.

15. The device as claimed in claim 2, wherein the first electromechanical transducer comprises at least one piezoelectric element.

16. The device as claimed in claim 2, wherein the second electromechanical transducer comprises at least one piezoelectric element.

17. An assembly comprising the device as claimed in claim 3 along with the external element of the motor vehicle, wherein the first electromechanical transducer is located at an antinode of the mode of vibration associated with said resonant frequency of the external element of the motor vehicle.

18. A system for detecting contact with and/or an approach toward a motor vehicle, which system comprises a device as claimed in claim 2 along with a computer configured to:
receive at least part of the electrical response signal generated by the vibration sensor,
analyze this signal, and
determine information relating to direct physical contact with the vehicle and/or information relating to an approach in relation to the vehicle.

19. The assembly as claimed in claim 18, wherein the second electromechanical transducer is located at least one node of the mode of vibration associated with said resonant frequency of the external element of the motor vehicle.

20. An assembly comprising the device as claimed in claim 2 along with the external element of the motor vehicle.

* * * * *